United States Patent [19]

Shiokama

[11] Patent Number: 5,109,245
[45] Date of Patent: Apr. 28, 1992

[54] ELECTRIC FOCUSING DEVICE

[75] Inventor: Yoshiharu Shiokama, Kawasaki, Japan

[73] Assignee: Nikon Corporation, Tokyo, Japan

[21] Appl. No.: 563,622

[22] Filed: Aug. 7, 1990

[30] Foreign Application Priority Data

Aug. 11, 1989 [JP] Japan .................. 1-209445

[51] Int. Cl.$^5$ ............................. G03B 13/34
[52] U.S. Cl. ................................. 354/195.1
[58] Field of Search ............ 354/400, 402, 403, 195.1

[56] References Cited

U.S. PATENT DOCUMENTS

4,508,443  4/1985  Matsuzaki et al. .................. 354/402
4,841,322  6/1989  Kawasaki et al. .................. 354/400

Primary Examiner—W. B. Perkey
Attorney, Agent, or Firm—Shapiro and Shapiro

[57] ABSTRACT

A camera comprises an operation member, a picture-taking lens, a drive for driving the picture-taking lens so as to focus the picture-taking lens, an information output for outputting stop value information of the picture-taking lens and a control for controlling driving of the picture-taking lens by the drive. In a first case in which the operation member is operated for a period longer than a predetermined period, the control drives the picture-taking lens during the period when the operation member is operated. In a second case in which the operation member is operated for a period shorter than the predetermined period, the control drives the picture-taking lens by a predetermined amount according to the stop value information in one operation of the operation member regardless of the operation time of the operation member.

14 Claims, 7 Drawing Sheets

ELECTRIC FOCUSING DEVICE

BACKGROUND OF THE INVENTION

1. Field of the Invention

The present invention relates to an electric focusing device known as a power focus device which drives a motor by manually operating a switch so as to perform a focusing operation of a picture-taking lens.

2. Related Background Art

A conventional method for focusing a picture-taking lens moves the lens by mechanically converting a rotational movement of a circular focusing ring to a linear movement by a helicoid mechanism or a cam mechanism, and therefore, gives an operator a good feeling of manipulating a camera.

Recently, auto-focusing cameras in which a picture-taking lens is focused by driving a motor have become quite popular. It has become increasingly common to provide a so-called power focus mechanism which moves a group of focusing lenses by turning on and off an electrical switch in accordance with the operation of an operation member to be manually operated, such as a push button, a seesaw lever and so on, and by controlling the rotation of a motor in response to a switch signal.

However, since a structure of the switch and the manual operation member in such a power focus mechanism is different from that of a circular focusing ring in a conventional mechanical focusing device, as good a feeling as that of the conventional focusing device cannot be obtained and a fine adjustment of the focusing is quite difficult.

In order to cope with this situation, a known method detects the amount of the rotation of an operation member, for example, a rotatable dial or ring, by a rotary encoder or the like and controls a motor in accordance with the detected amount of the rotation. Though this method can obtain a good operation feeling, it is advantageous in regard to cost and production because a mechanism for detecting the rotation is complicated and must be precisely manufactured, and because software for controlling the motor is also complicated.

U.S. Pat. No. 4,508,443 proposes, in a power focusing device using a push button which is easy to produce, a method of detecting the operation time of the switch, controlling a motor in accordance with the operation time of the switch, driving the motor while the switch is being operated if the operation time is long, and controlling the drive amount of the motor at a constant amount if the operation time is shorter than a predetermined time. Though this method can perform a fine adjustment of the focusing comparatively easily, because it is necessary to intermittently operate the operation member many times during the focusing operation in a fine adjustment state, it is difficult to achieve a quick focusing operation.

SUMMARY OF THE INVENTION

With the above problems in view, an object of the present invention is to provide an electric focusing device which has a simple structure and which can quickly perform a fine adjustment focusing operation.

The present invention relates to a picture taking apparatus provided with what is called a power focus device which electrically detects the operation of a manual operation member, that is, a power focus switch, and moves a group of lenses by driving a motor in accordance with the operation so as to perform a focusing operation.

In such a picture taking apparatus of the present invention, if the manual operation member is continuously operated for more than a predetermined time, a focusing operation which moves the lenses by driving the motor during the time corresponding to the operation time of the manual operation member may be performed. If the operation time of the operation member is shorter than the predetermined time, a fine adjustment focusing operation which moves the lenses by an amount determined according to stop value information may be performed, regardless of the actual operation time.

In one of two preferred modes of the invention the stop value information represents a control stop value at the picture taking time, and in the other it represents a full-aperture value of each picture taking lens.

When the stop value information represents the control stop value at the picture taking time, the amount of movement of the lenses by driving the motor in the fine adjustment focusing operation corresponds to the depth of focus at the picture taking time, wherefore it is unlikely that a picture will be out of focus. Furthermore, when the picture is taken at stopping-down-aperture, the amount of the movement of the lenses per power focus operation is increased, whereby the number of operations of the switch until the lenses are focused is reduced and the focusing operation can be effectively and quickly performed.

When the stop value information represents the full-aperture value of the picture-taking lens, the fine adjustment focusing operation can be performed using an amount of movement in accordance with the full-aperture value of the particular lens being used.

Furthermore, since the structure of the switch is relatively simple, it is advantageous in cost and production.

DESCRIPTION OF THE PREFERRED EMBODIMENTS

Figure 1:
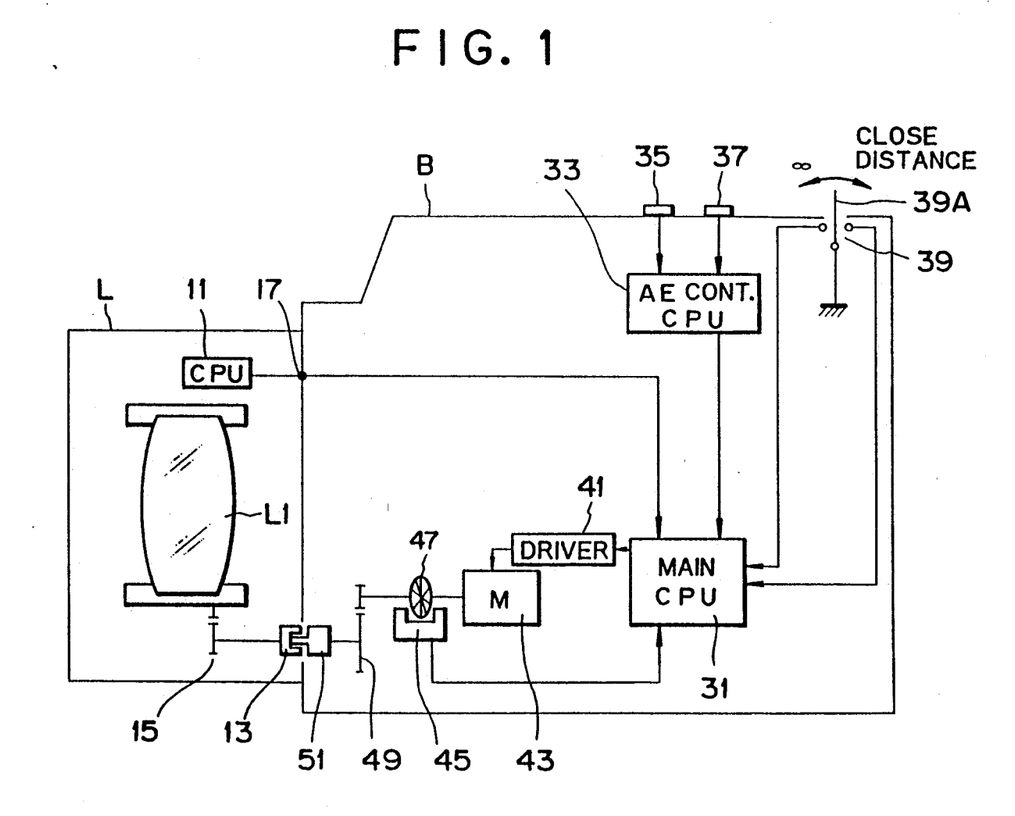
FIG. 1 is a view showing a structure of a first embodiment of the present invention.

FIG. 1 shows a structure of a first embodiment, in which the present invention is applied to a camera system whose picture-taking lens is interchangeable.

Referring to FIG. 1, an interchangeable lens L comprises a group of lenses L1 for focusing, a microcomputer 11 (referred to as a "CPU" hereinafter) for storing various data of the lenses to be transmitted to a camera body B in a memory, a coupling 13 for receiving the driving force of a motor from the body B, and a row of reduction gears 15 for moving the lenses.

The camera body B comprises a main CPU 31 for controlling a power focus operation and so on and an AE control CPU 33 for controlling exposure. The AE control CPU 33 controls an unillustrated mechanism relative to the exposure, and switches exposure modes, for example, a program AE mode, an aperture-priority AE mode, a shutter-speed-priority AE mode and a manual AE mode according to a setting by an AE mode selector 35. In the case of the manual AE mode or the aperture-priority AE mode, the AE control CPU 33 transmits a stop value Fs determined by the setting of a stop value setting switch 37 as stop value information to the main CPU 31, and in the case of the program AE mode and the shutter-speed-priority mode, it transmits a control stop value Fs determined by a program as stop value information to the main CPU 31. A power focus switch 39 including a control knob 39A transmits a "∞ direction indicator signal" or a "close direction indicator signal" to the main CPU 31 by operating the control knob 39A in the "∞" direction or the "close" direction shown in the figure.

The main CPU 31 transmits a drive control signal for a lens driving motor 43 to a driver circuit 41 according to the stop value data Fs from the AE control CPU 33 and the indicator signal from the power focus switch 39. The driver circuit 41 controls the drive of the motor 43 according to the drive control signal. The rotation of the motor 43 rotates the coupling 51 through the row of reduction gears 49. An encoder disk 47, with light-transmitting slits for detecting the rotation of the motor 43, is mounted on a shaft of the motor 43, generates a feedback pulse (which represents the rotation amount of the motor 43) in cooperation with a photointerrupter 45 and transmits the pulse to the main CPU 31.

Furthermore, the CPU 11 in the lens L and the main CPU 31 are connected through an electrical contact 17 at a mounting portion of the lens L1 and the camera body B, and the full-aperture value data Fo of the lens, the moving amount data Ac of an image surface per unit rotation of the coupling 13, and so on are transmitted from the lens L to the body B.

Figure 2:
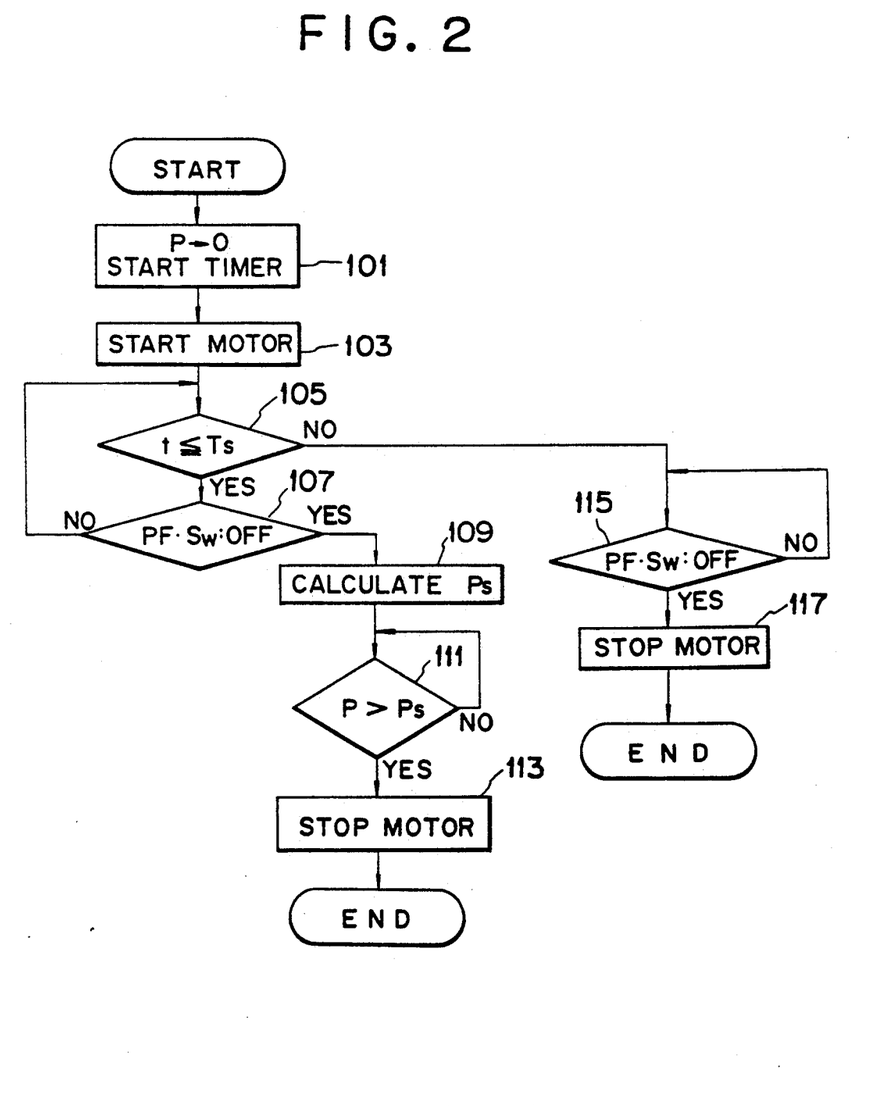
FIG. 2 is a flowchart showing a control process of the present invention.

FIG. 2 is a flowchart showing the motor control algorithm in the power focus device of the present invention. The operations of the embodiment shown in FIG. 1 will be described with reference to FIG. 2 as follows:

When a contact in either the "∞" direction or the "close" direction is closed by operating the control knob 39A of the power focus switch 39, an indicator signal corresponding to the contact is transmitted to the main CPU 31 and the control program shown in FIG. 2 is started.

A counter P for counting feedback pulses from the photointerrupter 45 is reset at 0 and an internal timer is started in Step 101. The motor 43 is started to rotate in the next Step 103. The motor 43 is rotated in response to the drive signal from the main CPU 31. The drive of the lenses is executed through the row of reduction gears 49, the couplings 51 and 13 and the row of reduction gears 15 in the lens L. The group of focusing lenses L1 is moved in the direction of its optical axis, and the focusing operation is started. While the motor is being driven, feedback pulses are generated from the photointerrupter 45 in correlation to the rotation of the encoder disk 47 and counted by the counter P.

In Step 105, the internal timer P is checked and it is detected whether or not a preset time Ts has passed. The preset time Ts is used to judge whether a fine adjustment focusing operation or a rough focusing operation has been performed. The value of the preset time Ts varies according to the structure of the power switch and so on, and may range from approximately several tens of ms to several hundreds of ms for example.

If the elapsed time t does not reach the preset time Ts in Step 105, it is checked whether or not the power focus switch (PF·SW) 39 is still operated in Step 107. If it is operated, Step 105 is executed again and the cycle of the check of the elapsed time t in Step 105 and the check of the operation of the power focus switch 39 in Step 107 is repeated. If the power focus operation is released and turned off within the preset time Ts, it is judged that the power focus operation is performed by a small amount, that is, the fine adjustment focusing operation is executed, and a slight drive routine of Steps 109, 111 and 113 is started. If the elapsed time t exceeds the preset time Ts, it is judged that the rough focusing operation is executed, and a rough focus drive routine of Steps 115 and 117 is started.

In the rough focus drive routine of Steps 115 and 117, the power focus switch (PF·SW) 39 is on, and during the power focus operation, the motor is driven in Step 115 until the power focus operation is stopped in response to the turn-off of the power focus switch (PF·SW) 39, whereupon the motor is stopped in Step 117.

In the slight drive routine of Steps 109, 111 and 113, when the power focus switch 39 is once operated, the lenses are moved a predetermined amount by the drive of the motor.

The above "predetermined amount" is an amount determined by the control stop value Fs which has been transmitted from the AE control CPU 33 to the main CPU 31. In the form shown, the motor is rotated for moving the lenses so as to move the image surface in an amount corresponding to the distance between the width of the depth of focus for the stop value Fs and half of the width of the depth of focus. If this "predetermined amount" is converted into the number of feedback pulses of the rotation of the motor, the number Ps of pulses corresponding to the "predetermined amount" is indicated by the following equation:

$$PS = (Fs/30)/(Ac/Nb) \sim 2 \times (Fs/30)/(Ac/Nb) \text{ [pulse]}$$

where:
Ac = moving amount of image surface per rotation of the coupling 13
Nb = number of feedback pulses which arise per rotation of the coupling 51
Fs/30 = a half of the width of depth of focus for the stop value Fs.

An expected drive amount Ps is calculated in Step 109, and it is checked whether or not the motor drive amount (the counted number P of pulses) to that point reaches the expected drive amount Ps in Step 111. If it does not reach, the motor drive is continued until it reaches the expected driving amount. When the drive by the pulses of the amount Ps is completed, the motor is stopped in Step 113 and the slight drive is completed.

FIGS. 3A, 3B, 3C and 3D show four cases of the relation between the operation state of the power focus switch (PF·SW) 39 and the motor drive.

Figure 3A:
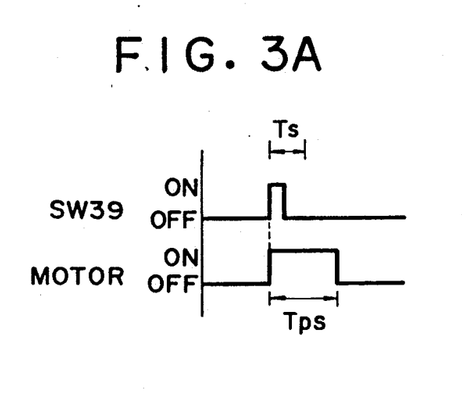
FIGS. 3A, 3B, 3C and 3D are explanatory views showing the relationship between a switching operation and a motor drive according to the present invention.
Figure 3B:
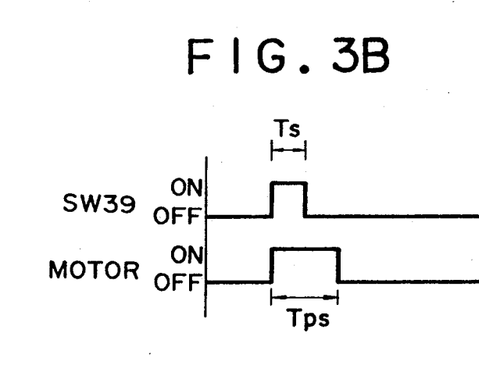
Figure 3C:
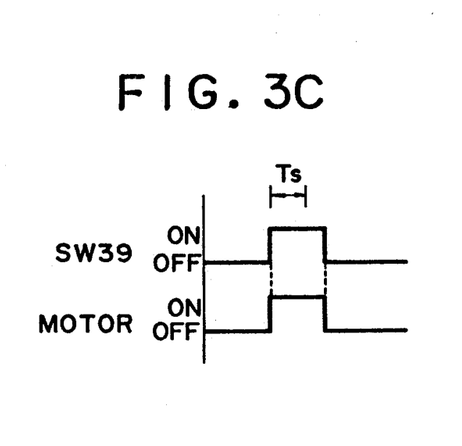
Figure 3D:
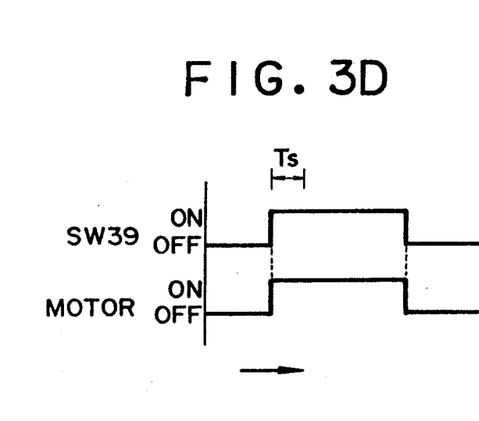

FIG. 3A shows the case in which the operation time of the power focus switch 39 is shorter than the preset time Ts. In this case, the motor is driven by the amount corresponding to the preset number Ps of feedback pulses even after the power focus switch 39 is turned off. FIG. 3B shows the case in which the operation time of the power focus switch 39 is equal to the preset time Ts, and the motor is driven by the amount corresponding to the preset number Ps of feedback pulses even after the power focus switch 39 is turned off. Furthermore, FIGS. 3C and 3D show the cases in which the operation time of the power focus switch 39 is longer than the preset time Ts. When the power focus switch 39 is turned off, the motor is stopped.

In the above cases, the driving time Tps corresponding to the preset number Ps of feedback pulses is longer than the preset time Ts, and even if the slight drive routine is started when the preset time Ts has passed, the drive corresponding to the preset number Ps of feedback pulses is possible. However, for example, if the moving amount Ac of the image surface per rotation of the coupling 13 is relatively large in the above-mentioned equation for calculating the preset number Ps of feedback pulses, the preset number Ps of feedback pulses is small and the driving time Tps corresponding to the number Ps of the pulses is short. In such a case, the driving time Tps corresponding to the preset number Ps of feedback pulses is shorter than the preset time Ts. As a result the following problem may arise: even if an attempt to enter the slight drive routine is made when the preset time Ts has passed, the drive exceeding the preset number Ps of feedback pulses is already completed. The second embodiment of the present invention to avoid the above problem will be described with reference to FIGS. 5A, 5B and 5C.

Figure 5A:
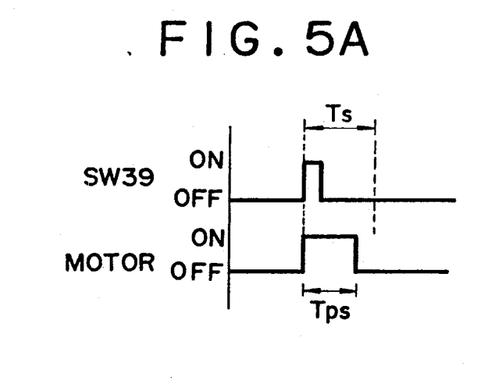
FIGS. 5A, 5B and 5C are explanatory views showing the relationship between a switching operation and a motor drive according to a second embodiment of the present invention.
Figure 5B:
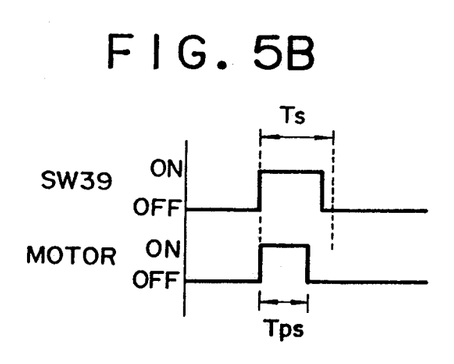
Figure 5C:
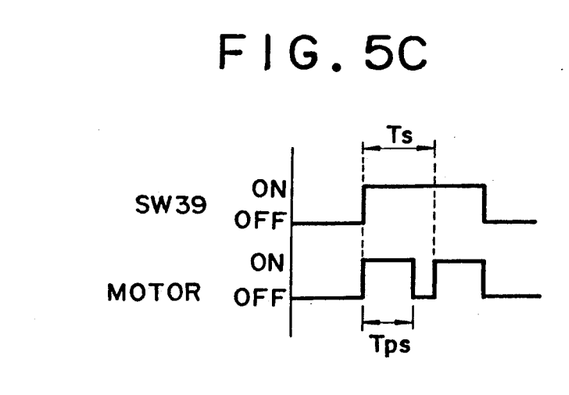

Referring to FIG. 5A, if the power focus switch 39 is turned off within the driving time Tps corresponding to the preset number Ps of feedback pulses, it is possible to begin the above-mentioned slight drive routine the moment the power focus switch 39 is turned off. Then, as shown in FIG. 5B, if the power focus switch 39 is in the "on" state for a time longer than the driving time Tps corresponding to the preset number Ps of feedback pulses and shorter than the preset time Ts, even if the power focus switch 39 is on, the motor is stopped when the drive corresponding to the preset number Ps of feedback pulses is completed. As shown in FIG. 5C, in the case in which the power focus switch 39 is in the "on" state for a time longer than the driving time Tps corresponding to the preset number Ps of feedback pulses and the preset time Ts, even if the power focus switch 39 is on, the motor is temporarily stopped when the drive corresponding to the preset number Ps of feedback pulses is completed. When the preset time Ts has passed and it is detected that the power focus switch 39 is still on, the drive of the motor is resumed and the above-mentioned successive drive routine is started. Thus, even in the case in which the moving amount Ac of the image surface per rotation of the coupling 13 is large, it is possible to certainly perform the slight drive operation.

Referring to the flowchart shown in FIG. 6, the above operations will be described.

Steps 101 and 103 are the same as those shown in FIG. 2. Ps is calculated in Step 120 and it is judged in Step 121 whether or not the number of pulses counted by the counter P exceeds Ps. If the number of pulses counted by the counter P exceeds Ps, it is judged in Step 122 whether or not the power focus switch 39 is off. If the power focus switch 39 is off, the motor is stopped in Step 123. If it is judged in Step 122 that the power focus switch 39 is on, it is judged in Step 124 whether or not the counted time t of the internal timer exceeds the preset time Ts. If the counted time t does not exceed the preset time Ts, the motor stopped until the counted time t exceeds the preset time Ts in Step 125, if the power focus switch remains on at step 126. When the counted time t exceeds the preset time Ts, the motor is started again in Step 127 and driven until the power focus switch 39 is turned off, as seen in Steps 128 and 129.

In the case in which it is previously known that the driving time Tps corresponding to the preset number Ps of feedback pulses is shorter than the preset time Ts, it is possible to make the time required for the drive corresponding to the preset number Ps of feedback pulses longer than the preset time Ts by controlling the drive speed of the lenses.

FIGS. 4A, 4B, 4C and 4D are explanatory views from which the advantages of the present invention will be further appreciated. The horizontal axis represents the moving direction of the image surface, the focusing point corresponds to an expected image surface (film surface), and the vertical axis represents the elapsed time. Furthermore, the area indicated by the alternating long dash and two short dash lines represents the width d in depth of focus whose center is the focusing point.

Figure 4A:
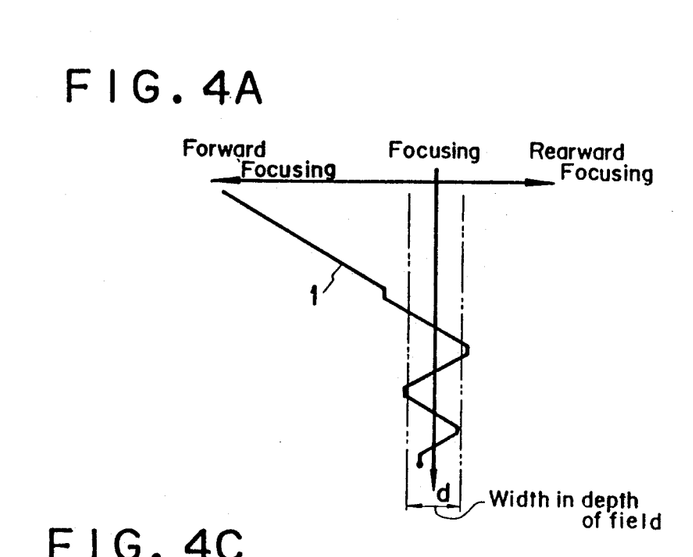
FIGS. 4A, 4B, 4C and 4D are explanatory views showing a trace of a lens in a power focus operation according to the present invention in comparison with a conventional trace.

FIG. 4A shows a case in which there is no slight drive routine and the motor is driven only while the power focus switch 39 is on. In this case, as shown by the trace 1 of the lens, since the adjustment of the operation amount of the focusing is difficult, the lens is moved too much or too little, and a desirable focusing is difficult to perform.

Figure 4B:
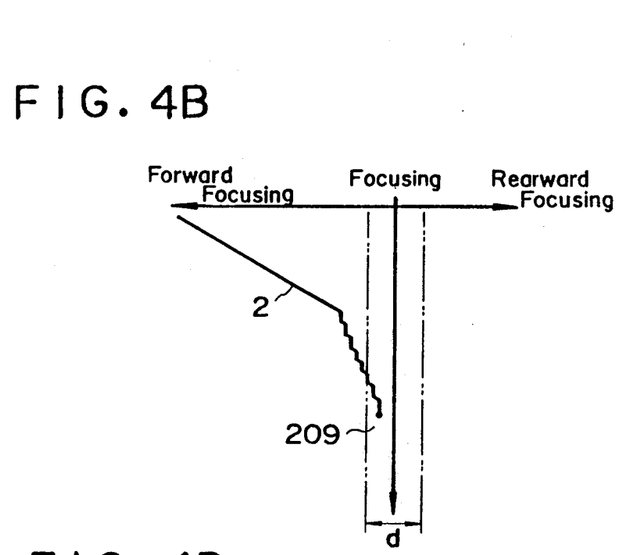

FIG. 4B shows the case of the slight drive routine in which the "predetermined driving amount" is always constant. If the amount is not proper, as shown by the trace 2 of the lens, it is necessary to repeatedly conduct a slight operation of the power focus lever to reach the focusing point. In the opposite case, the lens passes the focusing point and it takes much time to focus the lens.

Figure 4C:
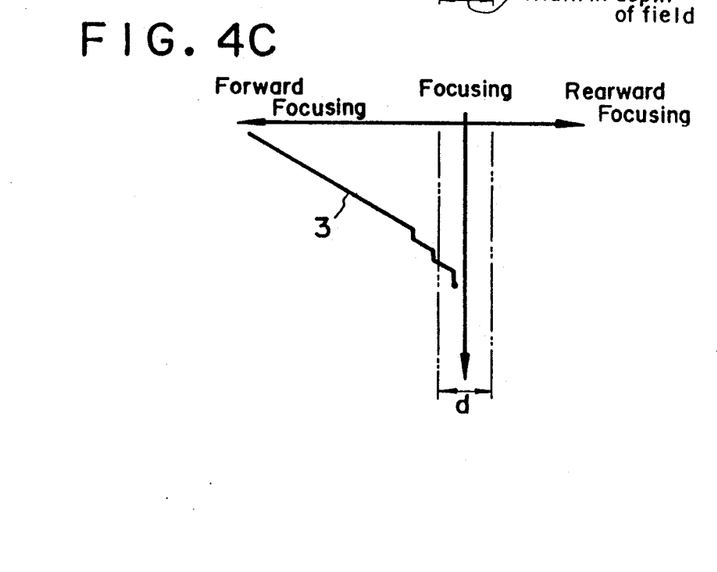
Figure 4D:
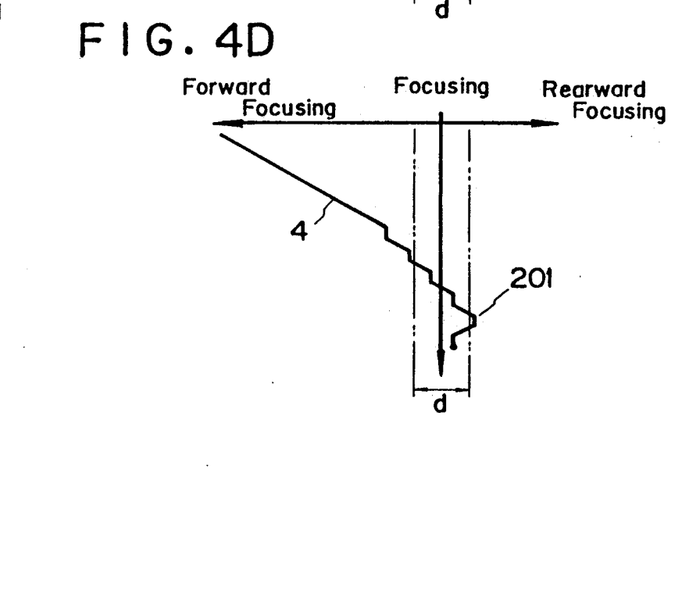

FIGS. 4C and 4D show the cases involving the embodiments of the present invention. As shown by the traces 3 and 4 of the lens, it is possible to reach the focusing point comparatively quickly.

Furthermore, as shown in FIG. 4D, even if the lens passes the focusing point and reaches the position 201, it is possible to focus the lens by slightly moving the lens once in the reverse direction.

Though an interchangeable lens camera which contains a drive motor in its body is used in the above embodiments, the present invention can be also applied to a camera system with a motor in its lens, a camera system with a power focus operation member on a lens barrel and a lens-fixed camera system.

As for the driving speed of the lens in the case of the rough focusing operation in which the power focus member is continuously operated over a predetermined time, the speed at which an image on a finder becomes out of focus is fixed by controlling the speed of the motor so that the moving speed of the image surface is constant, and it is thus possible to focus various lenses having the same visual feeling. An improvement of the second embodiment which makes such an operation possible will be described. In this case, the speed of the motor can be controlled by using the data of the moving amount of the image surface per unit rotation of the coupling 13 and the number Nb of feedback pulses per unit rotation of the coupling 51. In other words, the moving amount X of the image surface per feedback pulse is found according to the following equation:

$$X = Ac/Nb$$

and the cycle Tp of the feedback pulse for making the moving speed Vp of the image surface constant is found from the moving amount X of the image surface according to the following equation:

$$Tp = X/Vp$$

Then, the speed of the motor is controlled so that the period of generation of the feedback pulses is equal to Tp.

Figure 7:
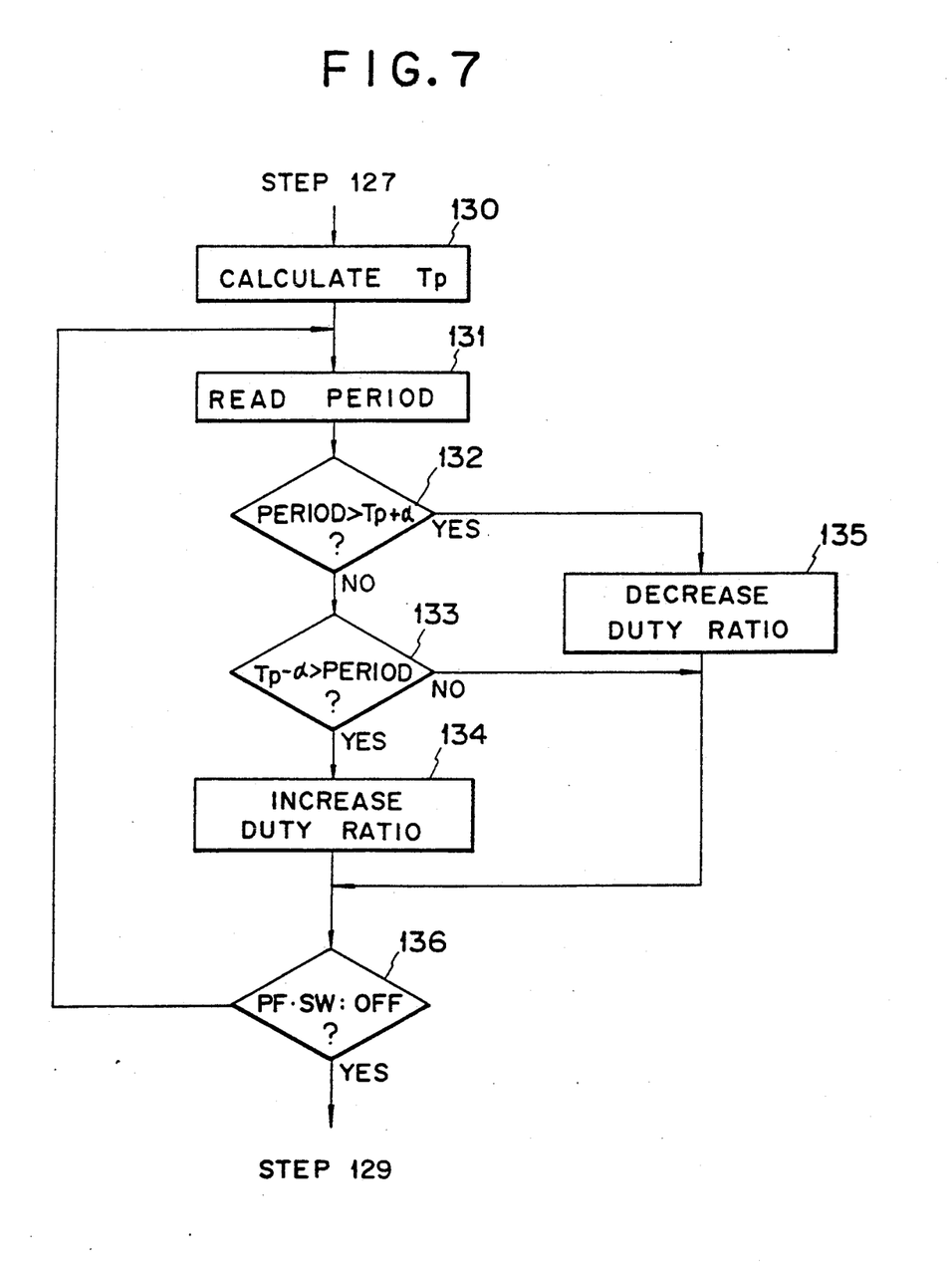
FIG. 7 is a flowchart partially showing operations of an improvement of the second embodiment of the present invention.

FIG. 7 is a flowchart showing control operations of the motor drive according to the above Tp.

Figure 6:
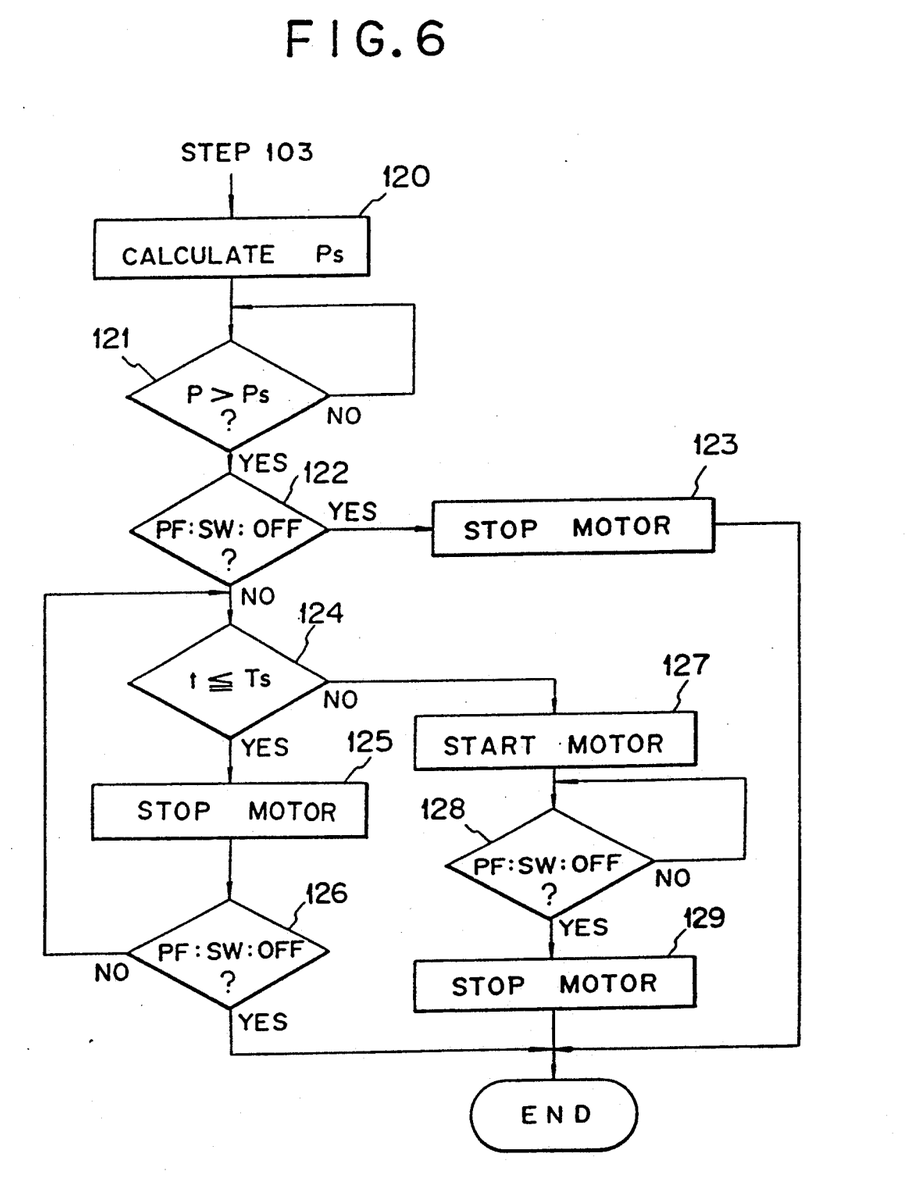
FIG. 6 is a flowchart partially showing operations of the second embodiment of the present invention.

After Step 127 shown in FIG. 6, the above Tp is calculated in Step 130. The period of the feedback pulses is read in Step 131 and it is judged in Step 132 whether or not the period read in Step 131 exceeds $Tp + \alpha$. If the period read does not exceed $Tp + \alpha$, it is judged in Step 133 whether or not the period read is smaller than $Tp - \alpha$. $\alpha$ is 0 or a positive value and is determined within a permissible speed range. If the period read in Step 133 is not smaller than $Tp - \alpha$, the period of the feedback pulses are within a proper range, the duty ratio of the pulse drive of the motor is fixed, and Step 136 is executed. If it is judged in Step 132 that the period read exceeds $Tp + \alpha$, the duty ratio of the pulse drive of the motor is reduced by a predetermined amount. The motor has such a known structure that its speed is lowered as the duty ratio is decreased and the speed is increased as the duty ratio is increased. Therefore, the speed of the motor is decreased in Step 135. If it is judged in Step 133 that the period read is smaller than $Tp - \alpha$, the duty ratio is increased by a predetermined amount in Step 134.

In the third embodiment of the present invention, the stop value information represents an full-aperture value of a picture-taking lens. In this case, the stop value information corresponds to the full-aperture value data F0 from the CPU 11 shown in FIG. 1. If the full-aperture value of the lens mounted in the camera body B is different, the driving amount in response to one operation of the operation member differs in the fine adjustment focusing state.

As described above, according to the present invention, even a power focus operation member which has a simple structure, such as a push button, can quickly and precisely perform a focusing operation.

Furthermore, since the slight driving amount in the fine adjustment focusing operation corresponds to the stop value set at the picture-taking time, a proper slight driving amount can be set for interchangeable lenses having different full-aperture values and a zoom lens whose stop value varies according to the zooming operation.

In particular, since the slight driving amount is set as the moving amount of the image surface, a proper slight driving amount is set and an efficient power focusing operation can be performed for a zoom lens in which the moving amount of the image surface varies according to the zooming operation.

What is claimed is:

1. A camera, comprising:
   an operation member having a first state and a second state;
   drive means for driving a picture-taking lens;
   information output means for outputting picture-taking-lens stop value related information which is changeable; and
   control means for calculating a correspondingly changeable control amount based on said stop value related information, and for causing said drive means to drive said picture-taking lens when said operation member is in said first state and not to drive said picture-taking lens when said operation member is in said second state,
   wherein said control means causes said drive means to drive said picture-taking lens substantially throughout a period in which said first state of said operation member is maintained for at least a predetermined time, and to drive said picture-taking lens by the calculated control amount when said first state of said operation member is terminated before said predetermined time.

2. A camera according to claim 1, wherein said information output means calculates a stop value at a picture-taking time and outputs the calculated stop value as said stop value related information.

3. A camera according to claim 1, wherein said information output means outputs a full-aperture value of said picture-taking lens as said stop value related information.

4. A camera according to claim 1, wherein said control amount corresponds to a moving amount of an image surface of the picture-taking lens which is within the width of the depth of focus for a stop value corresponding to said stop value related information.

5. A camera, comprising:
   an operation member having a first state and a second state;
   drive means for driving a picture-taking lens;
   information output means for outputting picture-taking-lens stop value related information which is changeable; and
   control means for calculating a correspondingly changeable control amount based on said stop value related information,
   wherein said control means causes said drive means to drive said picture-taking lens by the calculated control amount in response to a shift of said operation member from said second state to said first state, and when said operation member is maintained in said first state for a period longer than a predetermined time, said control means causes said drive means to drive said picture-taking lens substantially throughout the portion of said period after said predetermined time.

6. A camera according to claim 5, wherein said information output means calculates a stop value at a picture-taking time and outputs the calculated stop value as said stop value related information.

7. A camera according to claim 5, wherein said information output means outputs a full-aperture value of said picture-taking lens as said stop value related information.

8. A camera according to claim 5, wherein said control amount corresponds to a moving amount of an image surface of the picture-taking lens which is within the width of the depth of focus for a stop value corresponding to said stop value related information.

9. A camera, comprising:
an operation member having a first state and a second state;
drive means for driving a picture-taking lens;
information output means for outputting picture-taking-lens stop value related information which is changeable; and
control means for calculating a correspondingly changeable control amount based on said stop value related information and for causing said drive means to drive said picture-taking lens when said operation member is in said first state and not to drive said picture-taking lens when said operation member is in said second state;
wherein when said operation member is maintained in said first state for a period longer than a predetermined time, said control means causes said drive means to drive said picture-taking lens substantially throughout at least the portion of said period after said predetermined time, and when said operation member is maintained in said first state for a period less than said predetermined time, said control means causes said drive means to drive said picture-taking lens by the calculated control amount.

10. A camera according to claim 9, wherein said control means calculates said control amount based on a stop value indicated by said stop value related information.

11. A camera according to claim 10, wherein said information output means calculates a stop value at a picture-taking time and outputs the calculated stop value as said stop value related information.

12. A camera according to claim 10, wherein said information output means outputs a full-aperture value of said picture-taking lens as said stop value related information.

13. A camera according to claim 10, further comprising pulse generating means for generating a pulse for each predetermined driving amount of said drive means,
wherein said control means detects a generating period of said pulse and controls said drive means so that the moving speed of an image surface of said picture-taking lens is substantially constant.

14. A camera according to claim 9, wherein said control amount corresponds to a moving amount of an image surface of the picture-taking lens which is within the width of the depth of focus for a stop value corresponding to said stop value related information.

* * * * *